(12) United States Patent
Bauer et al.

(10) Patent No.: US 6,746,803 B1
(45) Date of Patent: Jun. 8, 2004

(54) COMPOSITE BODIES USED AS SEPARATORS IN ELECTROCHEMICAL CELLS

(75) Inventors: Stephan Bauer, Ostercappeln (DE); Bernd Bronstert, Otterstadt (DE); Helmut Möhwald, Annweiler (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/958,288

(22) PCT Filed: Apr. 7, 2000

(86) PCT No.: PCT/EP00/03134

§ 371 (c)(1),
(2), (4) Date: Oct. 9, 2001

(87) PCT Pub. No.: WO00/62355

PCT Pub. Date: Oct. 19, 2000

(30) Foreign Application Priority Data

Apr. 9, 1999 (DE) .......................... 199 16 109

(51) Int. Cl.⁷ .......................... H01M 2/16; H01M 6/00; C25B 9/00
(52) U.S. Cl. ................. 429/306; 429/144; 429/309; 429/310; 429/315; 429/317; 429/319; 429/321; 29/623.3; 204/252
(58) Field of Search ................. 429/142, 144, 429/188, 303, 306, 309, 310, 315, 317, 319, 321; 29/623.3; 204/252

(56) References Cited

FOREIGN PATENT DOCUMENTS

| DE | 198 50 826 | 5/2000 |
|----|-----------|--------|
| EP | 0 708 791 | 5/1996 |
| EP | 0 715 364 | 6/1996 |
| EP | 0 718 901 | 6/1996 |
| GB | 2 027 637 | 2/1980 |
| WO | WO 97/37397 | 10/1997 |
| WO | WO 97/44838 | 11/1997 |
| WO | WO 99/18621 | 4/1999 |
| WO | WO 00/26977 | 5/2000 |

*Primary Examiner*—Thomas H. Parsons
(74) *Attorney, Agent, or Firm*—Keil & Weinkauf

(57) ABSTRACT

A composite comprises at least one first layer which includes a composite comprising
(a) from 1 to 99% by weight of a solid (I) with a primary particle size of from 5 nm to 100 μm or a mixture made from at least two solids,
(b) from 99 to 1% by weight of a polymeric binder (II) obtainable by polymerizing
b1) from 5 to 100% by weight, based on the binder (II), of a condensation product III made from
at least one compound IV which is capable of reacting with a carboxylic acid or with a sulfonic acid or with a derivative or with a mixture of two or more of these, and
at least one mol per mole of compound IV of a carboxylic or sulfonic acid V which has at least one functional group capable of free-radical polymerization, or of a derivative of these or of a mixture of two or more of these
and
b2) from 0 to 95% by weight, based on the binder (II), of another compound VII with an average molecular weight (number average) of at least 5000 having polyether segments in a main or side chain,
where the at least one layer has been applied to at least one second layer comprising at least one conventional separator.

11 Claims, No Drawings

COMPOSITE BODIES USED AS SEPARATORS IN ELECTROCHEMICAL CELLS

The present invention relates to composites which are suitable in particular as separators for electrochemical cells, preferably rechargeable cells and in particular lithium batteries and lithium ion batteries, to these separators and, respectively, electrochemical cells per se, and also to a process for producing these composites.

TECHNICAL FIELD

Electrochemical cells, in particular those which are rechargeable, are well known, for example from Ullmann's Encyclopedia of Industrial Chemistry, 5$^{th}$ ed., Vol. A3, VCH Verlagsgesellschaft mbH, Weinheim 1985, pages 343–397.

Due to their high specific energy storage density, lithium batteries and lithium ion batteries occupy a particular position among these cells, especially as secondary cells.

As described, inter alia, in the above extract from "Ullmann", such cells contain lithiated compound oxides of manganese, cobalt, vanadium or nickel. These may be described in the stoichiometrically simplest case as $LiMn_2O_4$, $LiCoO_2$, $LiV_2O_5$ or $LiNiO_2$.

These compound oxides react reversibly with substances, such as graphite, which are capable of incorporating lithium ions into their lattice, the lithium ions being removed from the crystal lattice and the metal ions within this, such as manganese, cobalt or nickel ions, being oxidized. In an electrochemical cell this reaction can be used to store electrical energy by separating the compound accepting lithium ions, i.e. the anode material, from the lithium-containing compound oxide, i.e. the cathode material, by means of an electrolyte through which the lithium ions forming the compound oxide can migrate into the anode material (charging).

The compounds suitable for reversible storage of lithium ions are usually secured to collector electrodes by means of a binder.

During charging of the cell, electrons flow through an external voltage source and lithium cations through the electrolyte toward the anode material. When the cell is used, the lithium cations flow through the electrolyte, whereas the electrons flow from the anode material to the cathode material through a load.

In order to avoid a short circuit within the electrochemnical cell, a layer which is electrically insulating but permeable to lithium cations is located between the two electrodes. This may be a so-called solid electrolyte or a conventional separator.

As is well known solid electrolytes and separators are composed of a carrier material, incorporated into which are a dissociable compound which contains lithium cations and serves to increase lithium ion conductivity and also usually other additives, such as solvents.

BACKGROUND ART

Microporous films have for some time been proposed as separators. For example, GB 2 027 637 describes a microporous film which comprises a matrix with from 40 to 90% by volume of a polyolefin and from 10 to 60% by volume of an inorganic filler and other constituents as respectively defined therein. The matrix described therein has 30 to 95% by volume of cavities, based on the volume of the film, and is a separator for lead accumulators.

EP-B 0 715 364 describes a two-layer battery separator with shutdown characteristics. The battery separator described there has a first microporous membrane which has a shutdown function and has been produced from a material selected from the class consisting of polyethylene, a blend comprising essentially polyethylene and of a copolymer of polyethylene. The separator also has a second microporous membrane which has a strengthening function and has been produced from a material selected from the class consisting of polypropylene, of a blend which comprises essentially polypropylene and a copolymer of polypropylene. According to the description, this separator has better mechanical strength and transit energy than the prior art.

EP-A 0 718 901 describes a three-layer battery separator with shutdown characteristics. This separator comprises a first and third microporous polypropylene membrane which in turn includes a microporous polyethylene membrane, where the first and third membrane has a greater puncture resistance and a higher melting point than the second membrane.

EP-A-0 708 791 describes a composite polymer electrolyte in membrane form which has an ion-conducting polymer gel applied to a matrix material made from a porous polytetrafluoroethylene membrane.

DE-A 198 59 826.3 describes a composite suitable as a separator in electrochemical cells and comprising a conventional, layered separator and at least one other layer, where these comprise a solid and a polymeric binder, a polymer or copolymer which has, along the chain, terminally and/or laterally, reactive groups which are capable of crosslinking reactions when exposed to heat and/or UV radiation.

DISCLOSURE OF THE INVENTION

It is an object of the present invention, taking into account this prior art, to provide a separator which likewise has a shutdown mechanism and, furthermore, has dimensional stability at high temperature (>150° C.) and further improved mechanical strength, and, furthermore, has excellent ion-conducting properties or is an alternative system to the composite of DE-A 19850826.3.

We have found that this object is achieved by means of a composite comprising at least a first layer which comprises a composition comprising
- (a) from 1 to 99% by weight of a solid (I) with a primary particle size of from 5 nm to 100 μm or a mixture made from at least two solids,
- (b) from 99 to 1% by weight of a polymeric binder (II) obtainable by polymerizing:
  - b1) from 5 to 100% by weight, based on the binder (II), of a condensation product III made from
    - α) at least one compound IV which is capable of reacting with a carboxylic acid or with a sulfonic acid or with a derivative or with a mixture of two or more of these, and
    - β) at least one mol per mole of compound IV of a carboxylic or sulfonic acid V which has at least one functional group capable of free-radical polymerization, or of a derivative of these or of a mixture of two or more of these and
  - b2) from 0 to 95% by weight, based on the binder (II), of another compound VII with an average molecular weight (number average) of at least 5000 having polyether segments in a main or side chain, where the at least one first layer has been applied to at least one second layer comprising at least one conventional separator.

The present invention further relates to a composite of the abovementioned type, where the polymeric binder (IIA) is obtainable by polymerizing b) from 5 to 75% by weight, based on the binder (IIA), of a compound VI which differs from the carboxylic or sulfonic acid V and from any derivative of these and is capable of free-radical polymerization, or of a mixture of two or more of these and b2) from 25 to 95% by weight, based on the binder (IIA), of another compound VII with an average molecular weight (number average) of at least 5000 having polyether segments in the main or side chain.

The composition present in the at least one first layer, and the preparation of the same, is now described in more detail below.

MODE(S) for CARRYING OUT THE INVENTION

The solid I is preferably selected from the class consisting of an inorganic solid, preferably a basic inorganic solid, selected from the class consisting of oxides, mixed oxides, carbonates, silicates, sulfates, phosphates, amides, imides, nitrides and carbides of elements of the $1^{st}$, $2^{nd}$, $3^{rd}$ or $4^{th}$ principal group, of the $4^{th}$ transition group, or the periodic table; a polymer selected from the class consisting of polyethylene, polypropylene, polystyrene, polytetrafluoroethylene and polyvinylidene fluoride; polyamides, polyimides; a solid dispersion comprising a polymer of this type; glass powder, nanoglass particles, e.g. Monosper® (Merck), microglass particles, e.g. Spheriglas® (Potters-Ballotini), nanowhiskers and a mixture of two or more of these, where the composition obtained can be used as a solid electrolyte and/or separator.

The term "solid III" comprises any compound which is solid under standard conditions of temperature and pressure and which does not either accept or release electrons during operation of the battery under the conditions prevailing during charging of batteries, in particular lithium-ion batteries.

The compounds primarily used as solid III in this layer are inorganic solids, preferably a basic inorganic solid selected from the class consisting of oxides, mixed oxides, silicates, sulfates, carbonates, phosphates, nitrides, amides, imides and carbides of elements of the $1^{st}$, $2^{nd}$, $3^{rd}$ or $4^{th}$ main group or of the $4^{th}$ transition group of the periodic table; a polymer selected from the class consisting of a polyethylene, polypropylene, polystyrene, polytetrafluoroethylene, polyvinylidene fluoride, polyamides and polyimides; a solid dispersion comprising a polymer of this type, and a mixture of two or more of these.

Mention should be made in particular, by way of example, of: oxides, e.g. silicon dioxide, aluminum oxide, magnesium oxide or titanium dioxide, compound oxides, for example of the elements silicon, calcium, aluminum, magnesium, titanium; silicates, e.g. ladder-type silicates, ino-, phyllo- and tectosilicates, e.g. talc, pyrophyllite, muskovite, phlogophite, amphiboles, nesosilicates, pyroxenes, sorosilicates, zeolites, feldspars, wollastonite, in particular hydrophobicized wollastonite, mica, phyllosilicates; sulfates, e.g. alkali metal sulfates and alkaline earth metal sulfates; carbonates, such as alkali metal carbonates and alkaline earth metal carbonates, e.g. calcium, magnesium or barium carronate or lithium, potassium or sodium carbonate; phosphates, such as apatites; amides; imides; nitrides; carbides; polymers, e.g. polyethylene, polypropylene, polystyrene, polytetra-fluoroethylene, polyvinylidene fluoride, polyamides, polyimides, or other thermoplastics, thermosets or microgels, crosslinked polymer particles, e.g. Agfaperl®, solid dispersions, in particular those which comprise the abovementioned polymers, also mixtures of two or more of the abovementioned solids.

The solid I used may according to the invention also comprise inorganic Li-ion-conducting solids, preferably a basic inorganic Li-ion-conducting solid.

Those which should be mentioned are: lithium borates, e.g. $Li_4B_6O_{11} * xH_2O$, $Li_3(BO_2)_3$, $Li_2B_4O_7 * xH_2O$, $LiBO_2$, where the number x may be from 0 to 20; lithium aluminates, e.g. $Li_2O * Al_2O_3 * H_2O$, $Li_2Al_2O_4$, $LiAlO_2$; lithium aluminosilicates, e.g. lithium-containing zeolites, feldspars, feldspar substitutes, phyllo- and inosilicates, and in particular $LiAlSi_2O_6$ (spodumene), $LiAlSi_4O_{10}$ (petullite), $LiAlSiO_4$ (eucryptite), micas, e.g. $K[LiAl]_3[AlSi]_4O_{10}(F-OH)_2$, $K[Li,Al,Fe]_3[AlSi]_4O_{10}(F-OH)_2$; lithium zeolites, in particular those in fiber, sheet or cube form, and in particular those with the general formula $Li_{2/z}O * Al_2O_3 * xSiO_2 * yH_2O$ where z is the valency, x is from 1.8 to about 12 and y is from 0 to about 8; lithium carbides, e.g. $Li_2C_2$, $Li_4C$; $Li_3N$; lithium oxides and compound lithium oxides, e.g. $LiAlO_2$, $Li_2MnO_3$, $Li_2O$, $Li_2O_2$, $Li_2MnO_4$, $Li_2TiO_3$; $Li_2NH$; $LiNH_2$; lithium phosphates, e.g. $Li_3PO_4$, $LiPO_3$, $LiAlFPO_4$, $LiAl(OH)PO_4$, $LiFePO_4$, $LiMnPO_4$; $Li_2CO_3$; lithium silicates in the form of ladder-type silicantes, ino-, phyllo- and tectasilicates, e.g. $Li_2SiO_3$, $Li_2SiO_4$ and $Li_6Si_2$; lithium sulfates, e.g. $Li_2SO_4$, $LiHSO_4$, $LiKSO_4$; and also the Li compounds mentioned as compound Ib, where the presence of conductivity black is excluded when these are used as solid I; and also mixtures of two or more of the abovementioned Li-ion-conducting solids.

Preferred solids I are hydrophobicized solids I, more preferably hydrophobicized compounds of the abovementioned type.

Basic solids are particularly suitable here. For the purposes of the invention, basic solids are those whose mixture with a liquid, watercontaining diluent which itself has a pH of not more than 7 has a higher pH than this diluent.

The solids should advantageously be very substantially insoluble in the liquid used as electrolyte, and also be electrochemically inert in the battery medium.

Suitable solids I are those which have a primary particle size of from 5 nm to 20 μm, preferably from 0.01 to 10 μm and in particular from 0.1 to 5 μm, the particle sizes given being determined by electron microscopy. The melting point of the pigments is preferably above the usual operating temperature of the electrochemical cell, and melting points of above 120° C., in particular above 50° C., have proven particularly advantageous.

The pigments here may be symmetrical in their external shape, i.e. have a dimensional ratio of height to width to length (aspect ratio) of about 1 and be shaped as spheres or pellets, be approximately round in shape, or else be in the shape of any desired polyhedron, such as a cuboid, tetrahedron, hexahedron, octahedron or bipyramid, or may be distorted or asymmetric, i.e. have a dimensional ratio of height to width to length (aspect ratio) which is not equal to 1 and be, for example, in the form of needles, asymmetrical tetrahedra, asymmetrical bipyramids, asymmetrical hexa- or octahedra, lamellae or plates, or of fiber-like shape. If the solids are asymmetric particles, the upper limit given above for the primary particle size refers to the smallest axis in each case.

The composition used according to the invention comprises from 1 to 99% by weight, preferably from 15 to 90% by weight, more preferably from 25 to 85% by weight, in particular from 50 to 80% by weight, of a solid I, and from 1 to 99% by weight, preferably from 10 to 85% by weight, more preferably from 15 to 75% by weight, in particular from 20 to 50% by weight, of the polymeric binder II or IIA.

Compounds which may be used as compound IV, which is capable of reacting with a carboxylic or sulfonic acid V or with a derivative or with a mixture of two or more of these, are in principle any of the compounds which meet this criterion.

The compound IV is preferably selected from the class consisting of mono- and polyhydric alcohols whose main chain has only carbon atoms; mono- and polyhydric alcohols whose main chain has, besides at least two carbon atoms, at least one atom selected from the class consisting of oxygen, phosphorus and nitrogen; compounds containing silicon; amines having at least one primary amino group; amines having at least one secondary amino group; amino alcohols; mono- and polyhydric thiols; compounds having at least one thiol group and at least one hydroxyl group; and mixtures of two or more of these.

Among these, preference is in turn given to compounds IV which have two or more functional groups capable of reacting with the carboxylic or sulfonic acid.

When use is made of compounds IV which have amino functional groups, it is preferable to use those having secondary amino groups, so that after the condensation/crosslinking there are either no free NH groups present in the binder II at all or only small amounts of these groups.

Details of preferred compounds which should be mentioned are:

mono- or polyhydric alcohols whose main chain has only carbon atoms and which have from 1 to 20 alcoholic OH groups, preferably from 2 to 20 and in particular from 2 to 10 such groups, in particular di-, tri- and tetrahydric alcohols, preferably having from 2 to 20 carbon atoms, e.g. ethylene glycol, 1,2- and 1,3-propanediol, 1,2- and 1,3-butanediol, 1,4-butenediol, 1,4-bu-tynediol, 1,6-hexanediol, neopentyl glycol, 1,2-dodecanediol, glycerol, trimethylolpropane, pentaerythritol and sugar alcohols, hydroquinone, novolak and bisphenol A, but, as apparent from the above definition, it is also possible to use monohydric alcohols, e.g. methanol, ethanol, propanol, n-butanol, sec-butanol or tert-butanol; it is also possible to use polyhydroxyolefins, preferably those having two terminal hydroxyl groups, e.g. α,ω-di-hydroxybutadiene;

Polyester polyols as known, for example, from Ullmann's *Encyclopädie der technischen Chemie*, $4^{th}$ ed., Vol. 19, pp. 62–65 and obtained, for example, by reacting dihydric alcohols with polybasic, preferably dibasic, polycarboxylic acids;

mono- or polyhydric alcohols whose main chain contains, besides at least two carbon atoms, at least one oxygen atom, preferably polyether alcohols, e.g. polymerization products of alkylene epoxides, such as isobutylene oxide, propylene oxide, ethylene oxide, 1,2-epoxybutane, 1,2-epoxypentane, 1,2-epoxyhexane, tetrahydrofuran and styrene oxide; use may also be made of end-group-modified polyether alcohols, e.g. polyether alcohols modified with $NH_2$ end groups; these alcohols preferably have a molecular weight (number average) of from 100 to 5000, more preferably from 200 to 1000, in particular from 300 to 800; compounds of this type are known per se and available commercially, for example, with the trade names Pluriol® or Pluronic®(BASF Aktiengesellschaft);

alcohols as defined above in which some or all of the carbon atoms have been replaced by silicon; use may in particular be made here of polysiloxanes or alkylene oxide-siloxane copolymers or mixtures of polyether alcohols and polysiloxanes, as described, for example, in EP-B 581 296 and EP-A 525 728; that which has been said above also applies to the molecular weight of these alcohols;

alcohols as defined above, in particular polyether alcohols, in which some or all of the oxygen atoms have been replaced by sulfur atoms; that which has been said above also applies to the molecular weight of these alcohols;

mono- or polyhydric alcohols whose main chain comprises, besides at least two carbon atoms, at least one phosphorus atom or at least one nitrogen atom, e.g. diethanolamine and triethanolamine;

lactones which derive from compounds of the formula HO—$(CH_2)_z$—COOH, where z is a number from 1 to 20, e.g. ε-caprolactone, β-propiolactone, γ-butyrolactone or methyl-ε-caprolactone;

compounds containing silicon, e.g. di- or trichlorosilane, phenyltrichlorosilane, diphenyldichlorosilane or dimethylvinylchlorosilane; silanols, e.g. trimethylsilanol;

amines having at least one primary and/or secondary amino group, e.g. butylamine, 2-ethylhexylamine, ethylenediamine, hexamnethylenediamine, diethylenetriamine, tetraethylenepentamine, pentaethylenehexamine, aniline or phenylenediamine;

polyetherdiamines, e.g. 4,7-dioxadecane-1,10-diamine or 4,11-dioxatetradecane-1,14-diamine;

mono- or polyhydric thiols, e.g. aliphatic thiols, e.g. methanethiol, ethanethiol, cyclohexanethiol or dodecanethiol; aromatic thiols, e.g. thiophenol, 4-chlorothiophenol or 2-mercaptoaniline;

compounds having at least one thiol group and at least one hydroxyl group, e.g. 4-hydroxythiophenol, or else monothio derivatives of the polyhydric alcohols defined above; amino alcohols, e.g. ethanolamine, n-methylethanolamine, N-ethylethanolamine, N-butylethanolamine, 2-amino-1-propanol, 2-amino-1-phenolethanol, mono- or polyaminopolyols having more than two aliphatically bonded hydroxyl groups, e.g. tris(hydroxymethyl)methylamine, glucamine or N,N'-bis(2-hydroxyethyl)ethylene-diamine.

It is also possible to use mixtures of two or more of the compounds IV defined above.

According to the invention, the abovementioned compounds IV are condensed with a carboxylic or sulfonic acid V, which has at least one functional group capable of free-radical polymerization, or with a derivative of these or with a mixture of two or more of these. At least one, preferably all, of the free groups here capable of condensation within the compounds IV are condensed with the compound V.

For the purposes of the present invention, the carboxylic or sulfonic acid V may in principle be any carboxylic or sulfonic acid which has at least one functional group capable of free-radical polymerization, or else derivatives of these. The term "derivatives" used here includes both compounds which derive from a carboxylic or sulfonic acid modified at the acid function, e.g. esters, acid halides or anhydrides, and compounds which derive from a carboxylic or sulfonic acid modified on its carbon skeleton, e.g. halocarboxylic or halosulfonic acids.

Particular compounds V which should be, mentioned are: α,β un-saturated carboxylic acids and β,γ-unsaturated carboxylic acids. Particularly suitable α,β-unsaturated carboxylic acids here are those of the formula

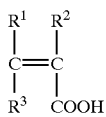

where $R^1$, $R^2$ and $R^3$ are hydrogen or $C_1$–$C_4$ alkyl radicals, and among these preference is in turn given to acrylic and methacrylic acids; successful use may also be made of cinnamic acid, maleic acid, fumaric acid, itaconic acid or p-vinylbenzoic acid, or else derivatives of these, e.g. anhydrides, such as maleic or itaconic anhydride;

halides, in particular chlorides, e.g. an acryloyl or a methacryloyl chloride;

esters, e.g. (cyclo)alkyl (meth)acrylates having up to 20 carbon atoms in the alkyl radical, e.g. methyl, ethyl, propyl, butyl, hexyl, 2-ethylhexyl, stearyl, lauryl, cyclohexyl, benzyl, trifluoromethyl, hexafluoropropyl or tetrafluoropropyl (meth)acrylate, polypropylene glycol mono(meth)acrylates, polyethylene glycol mono(meth)acrylates, poly(meth)acrylates of polyhydric alcohols, e.g. glycerol di(meth)acrylate, trimethylolpropane di(meth)acrylate, pentaerythritol di- or tri(meth)acrylate, diethylene glycol bis(mono(2-acryloxy)ethyl) carbonate, or poly(meth)acrylates of alcohols which themselves in turn have a group capable of free-radical polymerization, e.g. esters of (meth)acrylic acid and vinyl and/or allyl alcohol;

vinyl esters of other aliphatic or aromatic carboxylic acids, e.g.

vinyl acetate, vinyl propionate, vinyl butyrate, vinyl hexanoate, vinyl octanoate, vinyl decanoate, vinyl stearate, vinyl palmitate, vinyl crotonoate, divinyl adipate, divinyl sebacate, vinyl 2-ethylhexanoate or vinyl trifluoroacetate;

allyl esters of other aliphatic or aromatic carboxylic acids, e.g.

allyl acetate, allyl propionate, allyl butyrate, allyl hexanoate, allyl octanoate, allyl decanoate, allyl stearate, allyl palmitate, allyl crotonoate, allyl salicylate, allyl lactate, diallyl oxalate, diallyl malonate, diallyl succinate, diallyl glutarate, diallyl adipate, diallyl pimelate, diallyl cinnamate, diallyl maleate, diallyl phthalate, diallyl isophthalate, triallyl 1,3,5-benzenetricarboxylate, allyl trifluoroacetate, allyl perfluorobutyrate or allyl perfluorooctanoate;

β,γ-unsaturated carboxylic acids or derivatives of these, e.g. vinylacetic acid, 2-methylvinylacetic acid, isobutyl 3-butenoate, allyl 3-butenoate, allyl 2-hydroxy-3-butenoate or diketene; sulfonic acids, e.g. vinylsulfonic acid, allyl- or methallylsulfonic acid, or else halides or esters of these, vinyl benzenesulfonate or 4-vinylbenzenesulfonamide.

It is also possible to use mixtures of two or more of the carboxylic and/or sulfonic acids described above.

Individual examples which should be mentioned for the compound VI capable of free-radical polymerization which can be used to prepare the binder (IIA) are:

olefinic hydrocarbons, e.g. ethylene, propylene, butylene, isobutene, hexene and higher homologues and vinylcyclohexane;

(meth)acrylonitrile;

halogenated olefinic compounds, e.g. vinylidene fluoride, vinylidene chloride, vinyl fluoride, vinyl chloride, hexafluoropropene, trifluoropropene, 1,2-dichloroethylene, 1,2-difluoroethylene and tetrafluoroethylene;

vinyl alcohol, vinyl acetate, N-vinylpyrrolidone, N-vinylimidazole and vinylformamide;

phosphorus nitride chlorides, e.g. phosphorus dichloride nitride, hexachloro(triphosphazene), and also derivatives of these partially or completely substituted by alkoxy, phenoxy, amino or fluoroalkoxy groups, i.e. compounds which can be polymerized to give polyphosphazenes;

aromatic olefinic compounds, e.g. styrene or α-methylstyrene;

vinyl ethers, e.g. methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl vinyl ether.

It is, of course, also possible to use mixtures of the above compounds VI, in which case copolymers are produced. Depending on the nature of the preparation, these contain the monomers randomly distributed or represent block copolymers.

These compounds VI, like the condensation products III, are polymerized in customary ways known to the skilled worker, preferably by free-radical polymerization, and that which is said hereinbelow in relation to the compound VII applies here to the molecular weights obtained.

Possible compounds VII are primarily compounds with an average molecular weight (number average) of at least 5000, preferably from 5000 to 20,000,000, in particular from 100,000 to 6,000,000, and capable of solvating lithium cations and of functioning as binders. Examples of suitable compounds VII are polyethers and copolymers which have at least 30% by weight of the following structural unit, based on the total weight of the compound VII:

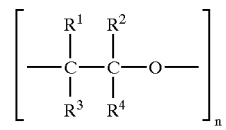

where $R^1$, $R^2$, $R^3$ and $R^4$ are aryl or alkyl groups, preferably methyl groups, or hydrogen and are identical or different and may contain heteroatoms, such as oxygen, nitrogen, sulfur or silicon.

Compounds of this type are described, for example, in M. B. Armand et al., Fast Ion Transport in Solids, Elsevier, New York, 1979, pp. 131–136, or in FR-A 7832976.

The compound VII may be composed of mixtures of two or more compounds of this type.

The polymeric binders II and IIA defined above may also be in the form of a foam, in which case the solid I is dispersed as such therein.

The compound VII advantageously has an average molecular weight (number average) of from 5000 to 100,000,000, preferably from 50,000 to 8,000,000. The binder II may be obtained by reacting from 5 to 100% by weight, preferably from 30 to 70% by weight, based on the binder II, of at least one condensation product III and from 0 to 95% by weight, in particular from 30 to 70% by weight, based on the binder II, of a compound VII. The compound VII of the binder IIA advantageously has an average molecular weight (number average) of from 5000 to 100,000,000, preferably from 50,000 to 8,000,000. The binder IIA may be obtained by reacting from 5 to 75% by weight, preferably from 30 to 70% by weight, based on the binder IIA, of a compound VI and from 25 to 95% by weight, in particular from 30 to 70% by weight, based on the binder IIA, of a compound VII To produce the one layer used according to the invention, a mixture may be prepared from a solid VI, a condensation product III and, if desired, a compound VII, or a mixture may be prepared from a solid III, a compound VI and a compound VII and customary additives, e.g. plasticizers, preferably polyethylene-oxide-containing or polypropylene-oxide-containing plasticizers.

Other polymers VIII which can be used may comprise thermoplastic and ion-conducting polymers. Those to be mentioned in particular are:

1) Polycarbonates, e.g. polyethylene carbonate, polypropylene carbonate, polybutadiene carbonate and polyvinylidene carbonate.
2) Homopolymers, block polymers and copolymers prepared from
   a) olefinic hydrocarbons, e.g. ethylene, propylene, butylene, isobutene, propene, hexene or higher homologs, butadiene, cyclopentene, cyclohexene, norbornene, vinylcyclohexane, 1,3-pentadiene, 1,3-,1, 4- and 1,5-hexadiene, isoprene and vinylnorbornene;
   b) aromatic hydrocarbons, such as styrene and methylstyrene;
   c) acrylates or methacrylates, such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl and tetrafluoropropyl acrylate and, respectively, methacrylate;
   d) acrylonitrile, metehacrylonitrile, N-methylpyrrolidone, N-vinylimidazole and vinyl acetate;
   e) vinyl ethers, e.g. methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl and tetrafluoropropyl vinyl ethers;
   f) polymers and copolymers of halogen-containing olefinic compounds, e.g. vinylidene fluoride, vinylidene chloride, vinyl fluoride, vinyl chloride, hexafluoropropene, trifluoropropene, 1,2-dichloroethylene, 1,2-difluoroethylene and tetrafluoroethylene; preferably polymers or copolymers of vinyl chloride, of acrylonitrile, or of vinylidene fluoride; copolymers made from vinyl chloride and vinylidene chloride, vinyl chloride and acrylonitrile, vinylidene fluoride and hexafluoropropylene and vinylidene fluoride with hexafluoropropylene; terpolymers made from vinylidene fluoride and hexafluoropropylene, and also from a member of the class consisting of vinyl fluoride, tetrafluoroethylene, and trifluoroethylene; in particular a copolymer made from vinylidene fluoride and hexafluoropropylene; and with further preference a copolymer comprising from 75 to 92% by weight of vinylidene fluoride and from 8 to 25% by weight of hexafluoropropylene.
   g) 2-vinylpyridine, 4-vinylpyridine and vinylene carbonate.

Regulators, e.g. mercaptans, may be used during the preparation of the polymers mentioned above if this is necessary and/or desirable.

3) Polyurethanes obtainable, for example, by reacting
   a) organic diisocyanates having from 6 to 30 carbon atoms, e.g. aliphatic non-cyclic diisocyanates, e.g. hexamethylene 1,5-diisocyanate and hexamethylene 1,6-diisocyanate, aliphatic cyclic diisocyanates, e.g. cyclohexylene 1,4-diisocyanate, dicyclohexylmethane diisocyanate and isophorone diisocyanate, or aromatic diisocyanates, e.g. tolylene 2,4diisocyanate, tolylene 2,6-diisocyanate, tetramethylxylene m-diisocyanate, tetra-methylxylene piisocyanate, tetrahydronaphthylene 1,5-diisocyanate and diphenylenemethane 4,4'-diisocyanate, or mixtures of compounds of this type,
   with
   b) polyhydric alcohols, e.g. polyesterols, polyetherols and diols.

The polyesterols are advantageously predominantly linear polymers having terminal OH groups, preferably those having two or three, in particular two, terminal OH groups. The acid number of the polyesterols is less than 10 and preferably less than 3. The polyesterols may be prepared in a simple manner by esterifying aliphatic or aromatic dicarboxylic acids having from 4 to 15 carbon atoms, preferably from 4 to 6 carbon atoms, with glycols, preferably glycols having from 2 to 25 carbon atoms, or by polymerizing lactones having from 3 to 20 carbon atoms. Examples of dicarboxylic acids which may be used are glutaric acid, pimelic acid, suberic acid, sebacic acid, dodecanoic acid and preferably adipic acid and succinic acid. Suitable aromatic dicarboxylic acids are terephthalic acid, isophthalic acid, phthalic acid or mixtures of these dicarboxylic acids with other dicarboxylic acids, e.g. diphenic acid, sebacic acid, succinic acid and adipic acid. The dicarboxylic acids may be used individually or as mixtures. To prepare the polyesterols it may on occasions be advantageous to use, instead of the dicarboxylic acids, the corresponding acid derivatives, such as carboxylic anhydrides or carboxylic chlorides. Examples of suitable glycols are diethylene glycol, 1,5-pentanediol, 1,10decanediol and 2,2,4-trimethyl-1,5-pentanediol. Preference is given to the use of 1,2-ethanediol, 1,3-propanediol, 2-methyl- 1,3-propanediol, 1,4-butanediol, 1,6-hexanediol, 2,2dimethyl- 1,3-propanediol, 1,4-dimethylolcyclohexane, 1,4-diethanolcyclohexane and ethoxylated or propoxylated products of 2,2-bis(4-hydroxyphenylene)propane (bisphenol A). Depending on the properties desired in the polyurethanes, the polyols may be used alone or as a mixture in various quantity ratios. Examples of suitable lactones for preparing the polyesterols are $\alpha,\alpha$-dimethyl-$\beta$-propiolactone, $\gamma$-butyrolactone and preferably $\epsilon$-caprolactone.

The polyetherols are essentially linear substances having terminal hydroxyl groups and containing ether bonds. Suitable polyetherols may readily be prepared by polymerizing cyclic ether, such as tetrahydrofuran, or by reacting one or more alkylene oxides having from 2 to 4 carbon atoms in the alkylene radical with a starter molecule which contains, bonded within the alkylene radical, two active hydrogen atoms. Examples of alkylene oxides are ethylene oxide, propylene 1,2-oxide, epichlorohydrin, butylene 1,2-oxide and butylene 2,3-oxide. The alkylene oxides may be used individually, alternating in succession or as a mixture. Examples of starter molecules used are water, glycols, such as ethylene glycol, propylene glycol, 1,4-butanediol and 1,6-hexanediol, amines, such as ethylenediarnine, hexamethylenediamine and 4,4'-diaminodiphenylmethane, and amino alcohols, such as ethanolamine. Suitable polyesterols and polyetherols, and also the preparation of these, are described, for example, in EP-B 416 386, and suitable polycarbonatediols, preferably those based on 1,6-hexanediol, and also the preparation of these, is described, for example, in U.S. Pat. No. 4 131 731.

Amounts of up to 30% by weight, based on the total weight of the alcohols, of aliphatic diols having from 2 to 20 carbon atoms, preferably 2 to 10 carbon atoms can advantageously be used, for example 1,2-ethanediol, 1,3-propanediol, 1,4-butanediol, 1,6-hexanediol, 1,5-pentanediol, 1,10-decanediol, 2-methyl-1,3-propanediol, 2,2-dimethyl-1,3-propane- diol, 2-methyl-2-butyl- 1,3-propanediol, 2,2-dimethyl-1,4-butanediol, 1,4-dimethylolcyclohexane, neopentyl glycol hydroxypivalate, diethylene glycol, triethylene glycol or methyldiethanolamine, or aromatic-aliphatic or aromatic-cycloaliphatic diols having from 8 to 30 carbon atoms, where possible aromatic structures are heterocyclic ring systems or preferably isocyclic ring systems, such as naphthalene derivatives or in particular benzene derivatives, such as bisphenol A, doubly symmetrically ethoxylated bisphenol A, doubly symmetrically propoxylated bisphenol A, more highly ethoxylated or propoxylated bisphenol A derivatives or bisphenol F derivatives, or also mixtures of compounds of this type.

Amounts of up to 5% by weight, based on the total weight of the alcohols, of aliphatic triols having from 3 to 15 carbon atoms, preferably from 3 to 10 carbon atoms may advantageously be used, for example trimethylolpropane or glycerol, the reaction product of compounds of this type with ethylene oxide and/or propylene oxide, or also mixtures of compounds of this type.

The polyhydric alcohols may have functional groups, for example neutral 10 groups, such as siloxane groups, basic groups, such as in particular tertiary amino groups, or acid groups, or salts thereof, or groups which readily convert into acid groups, which are introduced via a polyhydric alcohol. Use may advantageously be made of diol components which have groups of this type, for example N-methyldiethanolamine, diethyl N,N-bis( hydroxyethyl) aminomethylphosphonate or 3-sulfopropyl N,N-bis (hydroxyethyl)-2-aminoacetate, or dicarboxylic acids which have groups of this type and can be used for preparing polyesterols, for example 5-sulfoisophthalic acid.

Acid groups are in particular the phosphoric acid, phosphonic acid, sulfuric acid, sulfonic acid, carboxyl or ammonium group.

Examples of groups which readily develop into acid groups are the ester group or salts, preferably of the alkali metals, such as lithium, sodium or potassium.

4) The polyesterols described above per se, where care should be given to obtaining molecular weights of from 10,000 to 2,000,000, preferably from 50,000 to 1,000,000.

5) Polyamines, polysiloxanes and polyphosphazenes, in particular those discussed in the description of the polymer IIb2 above.

6) Polyetherols, as described, for example, in the discussion above of the polymer IIb1, as compound (c), or in the discussion of the polyurethanes.

It is, of course, also possible to use mixtures of the above polymers VIII. The copolymers VIII used according to the invention may, depending on the manner of preparation, contain a random distribution of the monomers, or may be block copolymers.

The polymer VIII is polymerized in a conventional manner known to the skilled worker, preferably free-radical polymerization. The polymer VIII may be used in high-molecular-weight or oligomeric form or as mixtures of these.

The proportion of the polymer VIII in the polymeric binder II to IIA is generally from 0 to 99% by weight, preferably from 20 to 80% by weight and more preferably from 40 to 70% by weight.

The present invention preferably provides composites with a first layer which comprises the following composition:

First layers as defined above, where the polymer VIII is selected from the class consisting of polymers or copolymers of vinyl chloride, of acrylonitrile, of vinylidene fluoride; copolymers of vinyl chloride and vinylidene chloride, vinyl chloride and acrylonitrile, vinylidene fluoride and hexafluoropropylene, or vinylidene fluoride with hexafluoropropylene; terpolymers of vinylidene fluoride and hexafluoropropylene and also one member of the group consisting of vinyl fluoride, tetrafluoroethylene and trifluoroethylene, is preferably a copolymer of vinylidene fluoride and hexafluoropropylene.

The compositions used according to the invention may moreover comprise a plasticizer IX. However, a plasticizer need not be used.

The proportion of the plasticizer IX, if used, based on the composition, is from 0.1 to 100% by weight, preferably from 0.5 to 50% by weight and in particular from 1 to 20% by weight.

Examples of plasticizers IX are those described in DE-A 198 19 752, preferably dimethyl carbonate, diethyl carbonate, dipropyl carbonate, ethylene carbonate, propylene 1,2-carbonate, propylene 1,3-carbonate, organic phosphorus compounds, in particular phosphates and phosphonates, e.g. trimethyl phosphate, triethyl phosphate, tripropyl phosphate, tributyl phosphate, tris(2-ethylhexyl) phosphate, polyalkylene oxide ethers and polyalkylene oxide esters, e.g. diglyme compounds, triglyme compounds and tetraglyme compounds, polymeric plasticizers, e.g. thermoplastic polyurethanes or polyamides, and also mixtures of these.

The compositions used according to the invention may be dispersed or dissolved in an inorganic or organic, preferably an organic liquid diluent, in which the mixture according to the invention should have a viscosity of preferably from 100 to 50,000 mPas, and then be applied to a substrate in a manner known per se, for example spray coating, casting, dipping, spin coating, roller coating, relief printing, gravure printing or planography or screen printing. Further processing may proceed as usual, e.g. by removing the diluent and curing the mixture.

Suitable organic diluents are aliphatic ethers, in particular tetrahydrofuran and dioxane, hydrocarbons, in particular hydrocarbon mixtures, such as petroleum spirit, toluene or xylene, aliphatic esters, in particular ethyl acetate and butyl acetate, and ketones, in particular acetone, ethyl methyl ketone and cyclohexane, and also DMF and NMP. It is also possible to use combinations of diluents of this type.

Possible substrates are the materials usually used for electrodes, preferably metals, such as aluminum or copper. It is also possible to use temporary substrates, such as films, in particular polyester films, such as polyethylene terephthalate films. Films of this type may advantageously have a release layer, preferably made from polysiloxanes.

The separators may also be produced thermoplastically, for example by injection molding, melt casting, compression, kneading or extruding, and if desired the composition used according to the invention may be calendered in a subsequent step.

After the film has been formed from the composition used according to the invention, volatile components, such as solvents or plasticizers, may be removed.

The composition used according to the invention may be crosslinked in a manner known per se, for example by irradiating with ionic or ionizing radiation, or an electron beam, preferably with an acceleration voltage of from 20 to 2000 kV and a radiation dose of from 5 to 50 Mrad, or with UV or visible light, advantageously adding, in the usual manner, an initiator such as benzil dimethyl ketal or 1,3,5-trimethylbenzoyltriphenylphosphine oxide in amounts of in particular not more than 1% by weight, based on the polymeric binder II/IIA, and crosslinking generally within a period of from 0.5 to 15 minutes; by thermal crosslinking via free-radical polymerization, preferably at above 60° C., where an initiator may advantageously be added, for example azobisisobutyronitrile in amounts of generally not more than 5% by weight, preferably from 0.05 to 1% by weight, based on the polymeric binder II/IIA; by electrochemically induced polymerization; or by ionic polymerization, for example by acid-catalyzed cationic polymerization, where possible catalysts are primarily acids, preferably Lewis acids, such as $BF_3$, or in particular $LiBF_4$ or $LiPF_6$. Catalysts containing lithium ions, such as $LiBF_4$ or $LiPF_6$ may advantageously remain here in the solid electrolyte or separator as conducting salt.

The crosslinking described above preferably takes place under an inert gas. The irradiation time here may according to the invention be controlled so that either complete crosslinking takes place or there is merely a short period of UV-light preirradiation to give only partial crosslinking.

As mentioned at the outset, the at least one second layer of the molding according to the invention comprises a conventional separator. According to the invention any conventional separator may be used here.

The following should be mentioned in particular in this connection:

separators based on microporous polyolefin films, as commercially available, for example, with the tralenames Celgard® and Hipore® and described, inter alia, in EP-A 0 718 901 and EP-B 0 715 364, the entire scope of both of which is incorporated into the present application by way of reference; polyethylene films and polypropylene films, and also films which comprise blends of polyethylene and, respectively, polypropylene with other polymers are similarly useful here;

microporous polytetrafluoroethylene (PTFE) films from Goretex, as described, for example, in EP-A 0 798 791, which is also incorporated into the present application by way of reference;

webs, fibers, and also nonwovens, all of which can be produced using fibrous polymer materials, e.g. polyolefin, polyamide or polyester fibers;

films available with the tradename Nafion®;

films based on a copolymer of vinylidene difluoride and hexafluoropropene, as described, for example, in U.S. Pat. No. 5,540,741 and U.S. Pat. No. 5,478,668;

homopolymers, block polymers and copolymers which in each case contain filler and can be obtained by extrusion, prepared from
  (a) olefinic hydrocarbons, e.g. ethylene, propylene, butylene, isobutene, propene, hexene or higher homologs, butadiene, cyclopentene, cyclohexene, norbornene or vinylcyclohexane;
  (b) aromatic hydrocarbons, e.g. styrene or methylstyrene;
  (c) acrylates or methacrylates, such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl acrylate and, respectively, methacrylate;
  (d) acrylonitrile, methacrylonitrile, N-methylpyrrolidone, N-vinylimidazole or vinyl acetate;
  (e) vinyl ethers, e.g. methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl vinyl ether;
  (f) halogen-containing olefinic compounds, such as vinyl chloride, vinyl fluoride, vinylidene fluoride, vinylidene chloride, hexa-fluoropropene, trifluoropropene, 1,2-dichloroethene, 1,2-difluoroethene or tetrafluoroethene,
    where the solids (I) according to the invention are used as fillers in these polymers; the composition and production of extruder films of this type are described in detail in DE-A 197 13 072.0.

To produce the novel composite, the at least one first layer is brought together with the at least one second layer, and according to the invention any known process may be used to bring layers of this type together. For example, the first layer may be applied to the second layer by processes at atmospheric pressure, e.g. casting or doctoring of the starting material for the first layer, or also by processes at superatmospheric pressure, e.g. extrusion, lamination, in particular hot lamination, calendering or compression. The resultant composite here may be cured or crosslinked by radiation, or electrochemically or thermally. In addition, the starting material for the at least one first layer may firstly be cured or crosslinked thermally, either partially or completely, and then, as described above, brought together at atmospheric pressure or at superatmospheric pressure with the second layer used according to the invention. If prefabricated films, i.e. the at least one first layer in the form of a film and also the conventional separator in the form of a film, are to be brought together, this preferably takes place by lamination, generally at from about 50 to about 160° C., preferably from about 70 to about 120° C., where in each case the precise temperatures used depend, in particular, on the respective conventional separator used. For example, if polypropylene films are used here the temperatures may be slightly higher than when polyethylene films are used. If the composite is produced by lamination, the composition of the first layer may also be in partially or completely crosslinked form and the composite obtained after lamination may, if required, be crosslinked again or else used directly without post-crosslinking.

If the novel composite is used as a separator in an electro-chemical cell, the composite is combined with conventional anodes and cathodes. In addition, a dissociable compound containing lithium cations, known as conducting salt, and, if desired, other additives, such as in particular organic solvents, sometimes called an electrolyte, may be incorporated. Some or all of the last mentioned substances may be admixed during the production of the novel composite or introduced after it has been produced.

Conducting salts which may be used are well known and described, for example, in EP-A 0 096 629. Conducting salts preferably used according to the invention are $LiPF_6$, $LiBF_4$, $LiClO_4$, $LiAsF_6$, $LiCF_3SO_3$, $LiC(CF_3SO_2)_3$, $LiN(CF_3SO_2)_2$, $LiN(SO_2C_nF_{2n+1})_2$, $LiC[(C_nF_{2n+1})SO_2]_3$, $Li(C_nF_{2n+1})SO_2$, where n from 2 to 20, $LiN(SO_2F)_2$, $LiAlCl_4$, $LiSiF_6$, $LiSbF_6$, $(RS_2)_nXLi$ ($_nX=_1O, _1S, _2N, _2P, _3C, _3Si$; $R=C_mF_{2m+1}$ where m=0–10 or $C_1$–$C_{20}$ hydrocarbons), Li imide salts, Li methide salts, or a mixture of two or more of these, and the use of $LiPF_6$ as conducting salt is particularly preferred.

Possible organic electrolyte solvents are the compounds discussed above under "plasticizers", and those preferably used are the conventional organic electrolytes, preferably esters, such as ethylene carbonate, propylene carbonate, dimethyl carbonate or diethyl carbonate, or mixtures of compounds of this type.

The thickness of the novel composites is advantageously from 5 to 500 μm, preferably from 10 to 500 μm, more preferably from 10 to 200 μm and in particular from 50 to 100 μm.

The composite may be assembled with the anodes and cathodes to give an electrochemical cell, which in turn is a solid composite article. This composite article advantageously has an overall thickness of from 30 to 2000 μm, in particular an overall thickness of from 50 to 1000 μm.

The present invention also provides a process which produces a composite of this type and comprises the following stages:

(A) producing at least one first layer as defined above;
(B) producing at least one second layer as defined above; and
(C) then combining the at least one first layer with the at least one second layer, by a conventional layering process.

The at least one first layer is preferably produced on a temporary substrate. According to the invention, conventional temporary substrates may be used here, e.g. a release film made from a polymer or from a preferably coated paper, e.g. a siliconized polyester film. However, this first layer may also be produced on a permanent substrate, e.g. a collector electrode, or else even entirely without a substrate.

The bringing together and the production of the layer defined above takes place by means of atmospheric-pressure processes for providing layers or for the production of films, such as casting or doctoring, or else by processes at superatmospheric pressure, such as extrusion, lamination, in particular hot lamination, calendering or compression. The resultant composite may, if desired, be cured or crosslinked by radiation or electrochemically or thermally.

It is also possible to use the process described above to bring the novel composite together with conventional electrodes and so to prepare a composite article with the constituents (release film/separator/electrode).

It is also possible, by double-sided coating of the composite, to provide a composite article with the constituents anode/separator/cathode.

For this, the composite, as a separator, with the anode film and/or cathode film, may be laminated together at >80° C. The novel composite here may readily be laminated to a conventional anode or cathode, giving a composite article—anode/—or cathode—separator—which may then, in turn, be combined with a conventional cathode or anode to form a composite comprising cathode-separator-anode.

A composite article of anode/separator/cathode as described above may also be produced without using a substrate and, respectively, the collector electrodes, since the novel composite comprising at least one fast and at least one second layer, as defined above, has per se sufficient mechanical stability for use in electrochemical cells.

The electrolyte and conducting salt may be placed into composite articles of this type or into the electrochemical cell either before the layers are brought together or preferably after the layers have been brought together, if desired after contact has been made with suitable collector electrodes, e.g. with a metal foil, or even after the composite or, respectively, the composite article, has been introduced into a battery casing. Here, the specific microporous structure of the layers in the novel composite, determined in particular by the presence of the solid I defined above permits the electrolyte and the conducting salt to be absorbed with displacement of the air in the pores. Depending on the electrolyte used, the loading may take place at from 0 to about 100° C.

The novel electrochemical cells may be used in particular as an automobile battery, appliance battery, flat-type battery, on-board battery, battery for static applications, or electrotraction battery.

The novel composite has the following advantages over the separators hitherto provided for use in electrochemical cells:

the combination of a conventional separator and the composition containing a solid I gives a composite which has exceptional mechanical stability, in particular excellent dimensional stability and improved compressive strength;

the novel composite may be used without difficulty in battery production on commercially available winding machinery used for that purpose;

the novel composite is a separator with shutdown mechanism.

Some examples will now be used to describe the present invention.

EXAMPLES

Production Example 1

Production of a Separator Film 75 g of a wollastonite (Tremin® 800 EST, Quarzwerke Frechen) hydrophobicized with epoxysilane and with a particle size of 3 μm were dispersed in 300 g of toluene using a high-speed stirrer. 12.5 g of a polyethylene oxide with an average molecular weight of $M_w$=2,000,000 (Polyox®, Union Carbide) and 12.5 g of a dimethacrylate of a propylene oxide-ethylene oxide block copolymer (Pluriol® PE 6000, BASF AG) and 0.02 g of a UV photo-initiator (Lucirin® BDK, BASF AG) were then added to the mixture, which was then applied to a siliconized polyethylene terephthalate film at 60° C. using a doctor with a casting gap of 300 μm, and the toluene was removed within a period of 5 minutes, giving a film of 30 μm thickness when the dried coating was peeled away.

Production Example 2

Production of a PEO tie Layer 6 g of polythylene oxie with an average molecular weight of $M_w$=2,000,000 (Polyox®, Union Carbide) were dissolved in 300 g toluene, The solution was doctored onto a siliconized polyethylene terephthalate film at 60° C. in such a way as to give the PEO tie layer a thickness of about 3 μm.

To produce the composite, the two films were bonded intimately to one another using an Ibica model IL12HR laminator at 80° C. The siliconized polyethylene terephthalate film on the side of the PEO tie layer was then removed. A commercially available separator film of Celgard® 2300 type (Hoechst Celanese) was then applied to the side of the PEO tie layer. The two films were then intimately bonded together at 80° C. with the aid of the laminator. After cooling, the second siliconized polyethylene terephthalate film could be removed from the separator composite film.

We claim:

1. A composite comprising at least one first layer which comprises a composite comprising
   (a) from 1 to 99% by weight of a solid (I) with a primary particle size of from 5 nm to 100 µm or a mixture made from at least two solids,
   (b) from 99 to 1% by weight of a polymeric binder (II) obtainable by polymerizing:
      b1) from 5 to 100% by weight, based on the binder (II), of a condensation product III made from
         at least one compound IV which is capable of reacting with a carboxylic acid or with a sulfonic acid or with a derivative or with a mixture of two or more of these, and
         at least one mol per mole of compound IV of a carboxylic or sulfonic acid V which has at least one functional group capable of free-radical polymerization, or of a derivative of these, or of a mixture of two or more of these, and
      b2) from 0 to 95% by weight, based on the binder (II), of another compound VII with an average molecular weight (number average) of at least 5000 having polyether segments in a main or side chain,
   where the at least one first layer has been applied to at least one second layer comprising at least one conventional separator.

2. A composite as claimed in claim 1, where the at least one first layer comprises a polymeric binder (IIA) obtainable by polymerizing
   b1) from 5 to 75% by weight, based on the binder (IIA), of a compound VI which differs from the carboxylic or sulfonic acid V and from any derivative of these and is capable of free-radical polymerization, or of a mixture of two or more of these, and
   b2) from 25 to 95% by weight, based on the binder (IIA), of another compound VII with an average molecular weight (number average) of at least 5000 having polyether segments in a main or side chain.

3. A composite as claimed in claim 1, where the at least one conventional separator is selected from the class consisting of a microporous polyolefin film and a polytetrafluoroethylene film.

4. A composite as claimed in claim 1, where the solid I is selected from the class consisting of
   an inorganic solid, selected from the class consisting of oxides, mixed oxides, silicates, sulfates, carbonates, phosphates, nitrides, amides, imides and carbides of elements of the $1^{st}$, the $2^{nd}$, the $3^{rd}$, and the $4^{th}$ principal group, and of the $4^{th}$ transition group, of the periodic table;
   a polymer selected from the class consisting of polyethylene, polypropylene, polystyrene, polytetrafluoroethylene and polyvinylidene fluoride; polyamides; polyimides; and a solid dispersion comprising a polymer of this type; and a mixture of two or more of these.

5. A composite as claimed in claim 1, where the at least one first layer comprises at least one other polymer VIII, which is selected from the class consisting of
   a polymer or copolymer of vinyl chloride, of acrylonitrile or of vinylidene fluoride;
   a copolymer made from vinyl chloride and vinylidene chloride, vinyl chloride and acrylonitril, vinylidene fluoride and hexa-fluoropropylene or vinylidene fluoride with hexafluoropropylene;
   a terpolymer made from vinylidene fluoride and hexafluoroproplene, and also a member of the class consisting of vinyl fluoride, tetrafluoroethylene and trifluoroethylene.

6. A composite as claimed in claim 5, where the polymer VIII is a copolymer made from vinylidene fluoride and hexafluoro-propylene.

7. A separator comprising at least one composite as claimed in claim 1.

8. An electrochemical cell comprising a separator as claimed in claim 7.

9. A process for producing a composite as claimed in claim 1, which comprises the following stages:
   (A) producing at least one first layer as defined in claim 1;
   (B) producing at least one second layer as defined in claim 1; and
   (C) then combining the at least one first layer with the at least one second layer by means of a conventional layering process.

10. A process as claimed in claim 9, where, to combine the at least one first layer with the at least one second layer, comprising at least one separator, the at least one first layer is applied by doctoring to the at least one conventional separator, or the at least one first layer is laminated to the at least one conventional separator.

11. A process as claimed in claim 10, where the at least one first layer is hot-laminated to the at least one conventional separator.

* * * * *